(12) United States Patent
Vigholm et al.

(10) Patent No.: US 12,000,112 B2
(45) Date of Patent: Jun. 4, 2024

(54) METHOD FOR CONTROLLING A HYDRAULIC SYSTEM OF A WORKING MACHINE

(71) Applicant: Volvo Construction Equipment AB, Eskilstuna (SE)

(72) Inventors: Bo Vigholm, Stora Sundby (SE); Johan Hallman, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 547 days.

(21) Appl. No.: 17/288,081

(22) PCT Filed: Oct. 24, 2018

(86) PCT No.: PCT/EP2018/079178
§ 371 (c)(1),
(2) Date: Apr. 23, 2021

(87) PCT Pub. No.: WO2020/083483
PCT Pub. Date: Apr. 30, 2020

(65) Prior Publication Data
US 2021/0372087 A1 Dec. 2, 2021

(51) Int. Cl.
*E02F 9/20* (2006.01)
*E02F 9/22* (2006.01)
(Continued)

(52) U.S. Cl.
CPC .......... *E02F 9/2095* (2013.01); *E02F 9/2217* (2013.01); *E02F 9/226* (2013.01);
(Continued)

(58) Field of Classification Search
CPC ....... E02F 9/2095; E02F 9/2217; E02F 9/226; E02F 9/2292; F15B 11/17; F15B 21/14;
(Continued)

(56) References Cited

U.S. PATENT DOCUMENTS 6,244,048 B1  6/2001  Tanaka et al.
2009/0100830 A1*  4/2009  Schneider ............... F15B 7/008
                                                           60/484

(Continued)

FOREIGN PATENT DOCUMENTS

CN  102418354 A  4/2012
CN  102767207 A  11/2012
(Continued)

OTHER PUBLICATIONS

English Translation of DE 102016217541 A1 Author: Nagel et al. Title: Hydraulic Drive System With Several Supply Lines Date: Mar. 15, 2018 (Year: 2018).*

(Continued)

*Primary Examiner* — James J Lee
*Assistant Examiner* — Steven Vu Nguyen
(74) *Attorney, Agent, or Firm* — Sage Patent Group

(57) ABSTRACT

Method for controlling a hydraulic system for a working machine, the system including a first electric machine connected to a first hydraulic machine the first hydraulic machine including an input side and an output side a second electric machine connected to a second hydraulic machine the second hydraulic machine including a high-pressure side and a low-pressure side the high-pressure side connected to the input side; a hydraulic consumer coupled to the output side via a supply line and configured to be powered by the first hydraulic machine; a first return line hydraulically coupling the hydraulic consumer to the input side and to the high-pressure side; wherein the method includes detecting a return flow from the hydraulic consumer through the first return line; and controlling the second hydraulic machine to maintain a pressure in the first return line at a pressure level higher than a predetermined minimum pressure level.

19 Claims, 14 Drawing Sheets

(51) Int. Cl.
F15B 11/17 (2006.01)
F15B 21/14 (2006.01)

(52) U.S. Cl.
CPC ............ E02F 9/2292 (2013.01); F15B 11/17 (2013.01); F15B 21/14 (2013.01); F15B 2211/20515 (2013.01); F15B 2211/20576 (2013.01); F15B 2211/30505 (2013.01)

(58) Field of Classification Search
CPC .. F15B 2211/20515; F15B 2211/20576; F15B 2211/30505
See application file for complete search history.

(56) References Cited

U.S. PATENT DOCUMENTS

| | | | |
|---|---|---|---|
| 2012/0055149 | A1 | 3/2012 | Vonderwell |
| 2013/0152573 | A1 | 6/2013 | Tsuruga et al. |
| 2015/0192149 | A1 | 7/2015 | Ma et al. |
| 2015/0361996 | A1 | 12/2015 | Yuan et al. |
| 2019/0136874 | A1* | 5/2019 | Olesen ................. E02F 9/2217 |

FOREIGN PATENT DOCUMENTS

| | | |
|---|---|---|
| CN | 205329756 U | 6/2016 |
| CN | 207176794 U | 4/2018 |
| DE | 10343016 A1 | 5/2005 |
| DE | 102016217541 A1 | 3/2018 |
| EP | 2824334 A1 | 1/2015 |
| JP | 2015206420 A | 11/2015 |
| WO | 2012030495 A2 | 3/2012 |
| WO | 2012055579 A9 | 12/2013 |

OTHER PUBLICATIONS

International Search Report and Written Opinion of the International Searching Authority, PCT/EP2018/079178 dated Jul. 10, 2019, 13 pages.

Chinese First Office Action dated Nov. 15, 2022, for Chinese Patent Application No. 201880098884.5, 15 pages (including English translation).

* cited by examiner

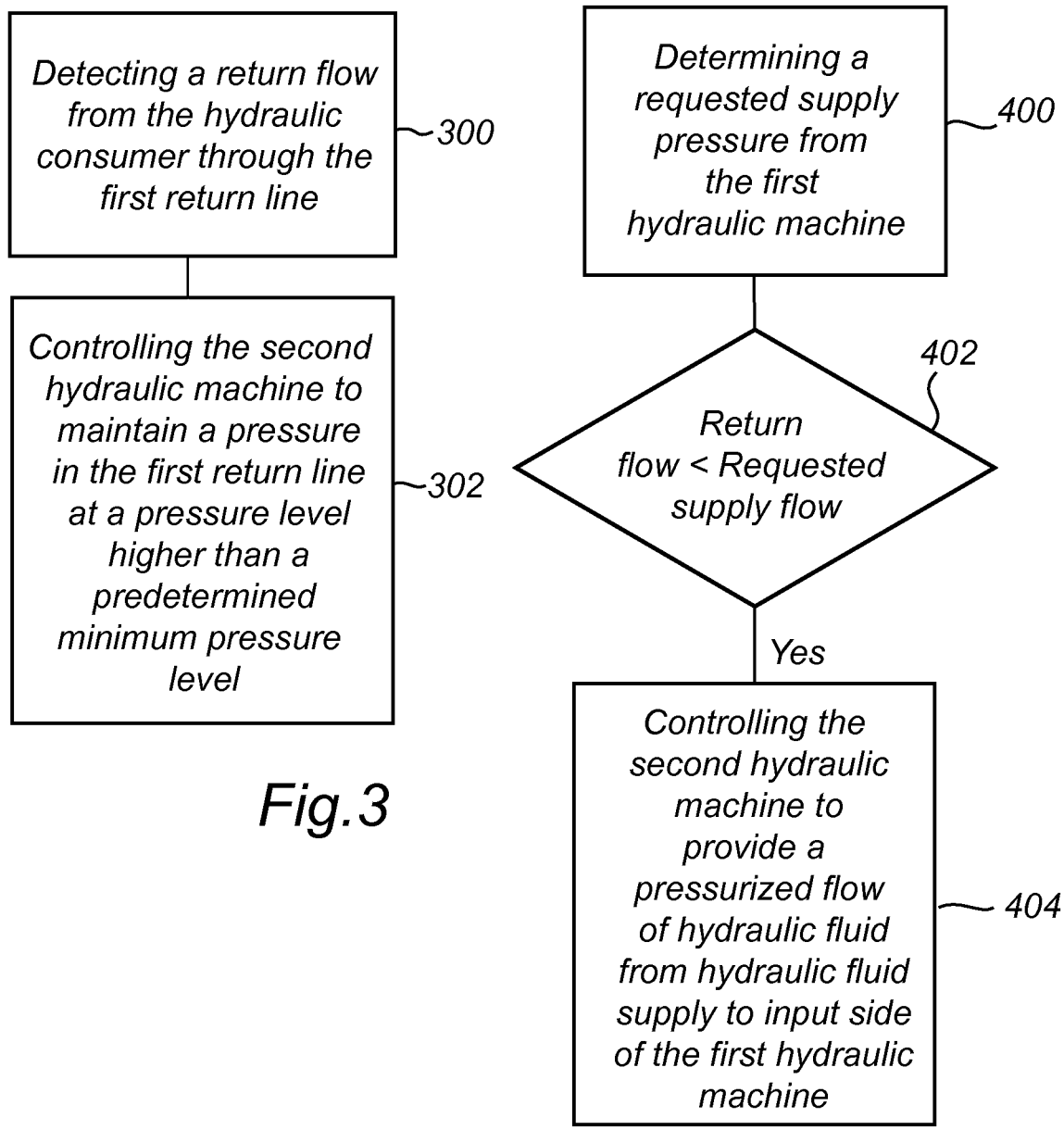

METHOD FOR CONTROLLING A HYDRAULIC SYSTEM OF A WORKING MACHINE

CROSS REFERENCE TO RELATED APPLICATIONS

This application is a 35 U.S.C. § 371 national stage application of PCT International Application No. PCT/EP2018/079178 filed on Oct. 24, 2018, the disclosure and content of which is incorporated by reference herein in its entirety.

TECHNICAL FIELD

The invention relates to a method for controlling a hydraulic system of a working machine. In particular, the method relates to a method for controlling a hybrid hydraulic system comprising both hydraulic machines and electric machines.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders.

BACKGROUND

In connection with transportation of heavy loads, e.g. in construction work, work machines are frequently used. A work machine may be operated with large and heavy loads in areas where there are no roads, for example for transports in connection with road or tunnel building, sand pits, mines and similar environments.

Work machines commonly employ a hydraulic system for providing power to functions such as steering and lifting. The hydraulic system may for example be powered by the internal combustion engine via a power take-off connected to an output shaft of the engine.

To improve the fuel efficiency of the working machine, a hybrid hydraulic system can be used. One interesting approach is to provide a hydraulic hybrid system comprising an electric machine for providing power to the hydraulic system. By combining the electric machine with an energy storage, energy can be recuperated and stored during certain operations to be used when required.

A typical wheel loader operation includes simultaneous operation with the two main subsystems of the motion system—driveline and work hydraulics. Since both systems are directly coupled to the engine shaft the interaction of the systems can be problematic.

Accordingly, it is desirable to further improve the efficiency of a hybrid hydraulic system.

SUMMARY

An object of the invention is to provide an improved method for controlling an electric hybrid hydraulic system for a working machine.

According to a first aspect of the invention, there is provided a method for controlling a hydraulic system for a working machine, the system comprising: a first electric machine connected to a first hydraulic machine, the first hydraulic machine comprising an input side and an output side; a second electric machine connected to a second hydraulic machine, the second hydraulic machine comprising a high-pressure side and a low-pressure side, the high-pressure side of the second hydraulic machine being connected to the input side of the first hydraulic machine; at least one hydraulic consumer hydraulically coupled to the output side of the first hydraulic machine via a supply line and configured to be powered by the first hydraulic machine; a first return line hydraulically coupling the hydraulic consumer to the input side of the first hydraulic machine and to the high-pressure side of the second hydraulic machine; wherein the method comprises: detecting a return flow from the hydraulic consumer through the first return line; and controlling the second hydraulic machine to maintain a pressure in the first return line at a pressure level higher than a predetermined minimum pressure level.

That the first electric machine is connected to the first hydraulic machine means that an output shaft of the electric machine is mechanically connected to an input shaft of the hydraulic machine such that the electric machine may operate as either a motor providing power to the hydraulic machine or as a generator generating power received from the hydraulic machine. The same applies for the second electric machine and the second hydraulic machine. It can further be assumed that the first and second electric machines are connected to an electrical power supply and/or an energy storage for powering the electric machines. Accordingly, in all examples where a hydraulic machine is described as providing a flow, it is powered by the electric machine operating as a motor, and when a hydraulic machine recuperates energy it is driving the electric machine as a generator.

In the present context, the second hydraulic machine is described as comprising a high-pressure side and a low pressure side. This means that the high-pressure side is connected to the hydraulic system where elevated pressures are common, and that the low-pressure side is connected to a hydraulic fluid supply such as a tank. The high-pressure side may also be referred to as the discharge side and the low-pressure side may be referred to as the suction side.

The present invention is based on the realization that the described hydraulic system comprising a first and a second hydraulic machine advantageously can be utilized to maintain a pressure in the first return line in order to facilitate more efficient energy recuperation. By means of the maintained pressure in the return line, the maximum rpm of the first hydraulic machine can be significantly increased. If the first hydraulic machine would be required to draw hydraulic fluid from the tank at atmospheric pressure, there would be an increasing risk for cavitation with increasing speed of the hydraulic machine.

This in turn has the advantageous effect that the first hydraulic machine can be smaller while maintaining the same overall system performance. A smaller hydraulic machine is desirable since both the cost and the required installation volume is decreased.

Moreover, it is common in hydraulic systems to maintain a certain backup pressure for selected hydraulic functions to provide a smoother operation of e.g. a hydraulic actuator in the form of a steering cylinder. In conventional hydraulic systems, the described backup pressure introduces losses in the hydraulic system. However, since the described system can be operated to recuperate energy in the return line, it allows for a higher pressure in the return line, in turn leading to improved operation of hydraulic actuators, without adding losses to the system.

Furthermore, additional electric and hydraulic machines may be arranged in parallel to the described second electric and hydraulic machines to further extend the functionality and flexibility of the described method. By using two hydraulic machines it may also be possible to use smaller machines compared to if only one would be used, thereby providing an advantage in terms of system installation and integration.

The detection of a pressurized flow from the hydraulic consumer may for example be achieved using one or more pressure sensors located at the hydraulic consumer. It is also possible to detect a return flow from the hydraulic consumer by means of identifying a control command provided to the hydraulic consumer since it may be known that a specific command under known circumstances gives rise to a return flow having known properties.

The pressure of the first return line may for example be monitored by means of a pressure sensor and the pressure can then be controlled by driving the second hydraulic machine based on an output signal of the pressure sensor. It is also possible to control the torque of the second electric machine, based on knowledge of the properties of the second hydraulic machine, thereby controlling the pressure in the first return line by means of the second hydraulic machine.

According to one embodiment of the invention, the method may further comprise: determining a requested supply pressure from the first hydraulic machine; and if the return flow of the first return line is lower than the supply flow required by the first hydraulic machine, controlling the second hydraulic machine to provide a pressurized flow of hydraulic fluid from a hydraulic fluid supply to the input side of the first hydraulic machine. Thereby, the return flow can be maximally utilized and the second hydraulic machine provides the additional flow required. Moreover, the first hydraulic machine can provide a significantly higher total flow when the input side of the first hydraulic machine is pressurized. The second hydraulic machine draws hydraulic fluid from tank, but only the amount corresponding to the difference between the requested flow and the return flow. Accordingly, the amount of hydraulic fluid which needs to be pressurized by the first hydraulic machine, i.e. drawn from a non-pressurized source, is minimized which in turn improves the overall energy efficiency of the hydraulic system.

According to one embodiment of the invention, the method may further comprise: determining a requested supply pressure from the first hydraulic machine; and if the return flow of the first return line is higher than the supply flow required of the first hydraulic machine, controlling the second hydraulic machine to recuperate energy by driving the second electric machine as a generator. Thereby, energy can be recuperated in the second hydraulic machine if there is excess flow in the return line which is not required by the first hydraulic machine. To recuperate the energy, there is a flow through the second hydraulic machine from the high-pressure side to the low-pressure side and the second electric machine is driven as a generator. It is assumed that there is either an energy storage capability such that the electrical energy generated by the second electric machine can be stored, or that there is a power distribution functionality such that the generated electrical energy can be reused directly.

According to one embodiment of the invention, the method may further comprise: determining a requested supply pressure from the first hydraulic machine; and if the requested supply pressure from the first hydraulic machine is lower than a return pressure in the first return line, controlling the first hydraulic machine to recuperate energy by driving the first electric machine as a generator, wherein a pressure drop over the first hydraulic machine is controlled to be the difference between the pressure in the first return line and the requested pressure. Thereby, energy can be recovered in the first electric machine in situation when the pressure of the return line exceeds the required supply pressure from the first electric machine.

According to one embodiment of the invention, the method may further comprise, in a hydraulic system where the at least one hydraulic consumer comprises a first hydraulic cylinder connected to the first return line and wherein the hydraulic system further comprises second and third hydraulic cylinders connected to a return valve block configured and arranged to control the return flow direction from the second and third hydraulic cylinders to the second hydraulic machine, the return valve block being coupled to a second return line connected to the input side of the first hydraulic machine and to the high-pressure side of the second hydraulic machine, the return valve block being further coupled to a third return line connected to the low-pressure side of the second hydraulic machine, wherein the method further comprises: controlling the return valve block based on operating properties of the first, second and/or third hydraulic cylinder such that energy is recovered by the first or second hydraulic machine. The properties of the hydraulic cylinders may for example be the flow and/or the pressure for a given situation or for an anticipated operation of the hydraulic system. The aim of the control method is to optimize the energy efficiency of the hydraulic system for any given operation of the hydraulic consumers based on current or anticipated operating properties of the hydraulic consumers, as will be described in further detail in the following. However, even though the focus of the present description is on the energy efficiency of the system, it is assumed that the maneuverability of the working machine is not negatively impacted. By means of the described return valve block the direction of the return flow from the second and third hydraulic cylinders can be controlled, meaning that it is controlled which one of the return flows that is directed to the high-pressure side of the second hydraulic machine. Thereby, the advantages of the two hydraulic machines can be utilized in a hydraulic system comprising a plurality of hydraulic consumers. In the described system comprising two hydraulic cylinders connected to the return valve block, it can be assumed that only one return flow is connected to the high pressure side of the second hydraulic machine, and that the other return flow, if existing, is connected to the low pressure side of the second hydraulic machine. It should be noted that the described methodology is applicable also for systems comprising a larger number of hydraulic consumers, where only the return valve block needs to be adapted based on the number of hydraulic consumers.

According to one embodiment of the invention, the method may further comprise: detecting an input requesting an operation of the hydraulic system; and controlling the return valve block to allow a return flow from a predetermined one of the first, second and third hydraulic cylinders based on the requested operation. Thereby, energy recuperation can be controlled in a predetermined manner based on known properties of the return flows from the hydraulic cylinders for a specific predetermined operation. In particular it can be controlled, by means of the valve block, which of the second and third hydraulic cylinder is to be connected to the high pressure side of the second hydraulic machine in before the requested operation begins, ensuring that energy recovery is maximized. The input may for example be a direct input from an operator of the vehicle such as actuating a lever to initiate an operation. The input may also be an input signal from a fully or partially autonomous system.

Accordingly, the described method can be particularly advantageous for automated hydraulic systems where operations can be anticipated in advance and where energy recuperation can be optimized based on a sequence of operations.

According to one embodiment of the invention, the method may further comprise: estimating a pressure of a return flow for each of the second and third hydraulic cylinder; and controlling the return valve block to allow a return flow to the high-pressure side of the second hydraulic machine from the hydraulic cylinder having the return flow with the highest pressure. Thereby, energy can be recuperated from the hydraulic cylinder having the return flow with the highest pressure. The estimated pressure of the return flow may be based on a pressure measurement. However, the estimated pressure may also be based on a control input described above, since it can be known for a given operation of the hydraulic system which of the second and third hydraulic cylinder will have the highest return pressure According to one embodiment of the invention, the method may further comprise: estimating a volume of hydraulic fluid to be ejected by each of the second and third hydraulic cylinder; and controlling the return valve block to allow a return flow to the high-pressure side of the second hydraulic machine from the hydraulic cylinder having the highest volume of hydraulic fluid to be ejected. Thereby, by knowing the volume of hydraulic fluid to be ejected by the respective hydraulic cylinder, the hydraulic cylinder determined to eject the largest volume can be selected to optimize energy recuperation.

According to one embodiment of the invention, the method may further comprise: estimating an energy of the hydraulic fluid to be ejected by each of the second and third hydraulic cylinder; and controlling the return valve block to allow a return flow to the high-pressure side of the second hydraulic machine from the hydraulic cylinder estimated to provide the highest energy. Thereby, the total energy of the return flow can be estimated in order to select energy recovery from the cylinder giving rise to the largest energy recuperation. In a first approximation, the energy can be estimates based on the volume of the hydraulic fluid to be ejected multiplied by the pressure. There may for example be situations where the one cylinder has a higher return pressure but a lower volume of hydraulic fluid to be ejected such that it is more advantageous to select a cylinder having a lower return pressure but where a larger return volume is expected.

According to one embodiment of the invention, estimating an energy of the hydraulic fluid to be ejected may comprise determining a start position and an end position of each of the first and second hydraulic cylinder for a known work operation of the hydraulic system. Thereby, the energy may be estimated for a known operation of the hydraulic system without the need to know specific details of the hydraulic cylinders.

According to one embodiment of the invention, wherein the second hydraulic cylinder is a lift cylinder, the method may further comprise: controlling the lift cylinder to lower an implement of the working machine; and if the requested supply flow from the first hydraulic machine is lower than the return flow from the lift cylinder, controlling the return valve block to provide the return flow from the lift cylinder to the high-pressure side of the second hydraulic machine and controlling the second hydraulic machine to recuperate energy by driving the second electric machine as a generator.

According to one embodiment of the invention, wherein the second hydraulic cylinder is a lift cylinder, the method may further comprise: controlling the lift cylinder to lower an implement of the working machine; and if the requested supply flow from the first hydraulic machine is higher than the return flow from the lift cylinder, controlling the return valve block to provide the return flow from the lift cylinder to the input side of the first hydraulic machine and controlling the second hydraulic machine to provide a flow to the input side of the first hydraulic machine corresponding to the difference between the supply flow requested from the first hydraulic machine and the return flow from the lift cylinder.

According to one embodiment of the invention, wherein the second hydraulic cylinder is a tilt cylinder, the method may further comprise: controlling the tilt cylinder to tilt an implement of the working machine; and if the requested supply flow from the first hydraulic machine is higher than the return flow from the tilt cylinder, controlling the return valve block to provide the return flow from the tilt cylinder to the input side of the first hydraulic machine and controlling the second hydraulic machine to provide a flow to the input side of the first hydraulic machine corresponding to the difference between the supply flow requested from the first hydraulic machine and the return flow from the tilt cylinder. The movement of the tilt cylinder may for example be a tilt-out operation performed when emptying a bucket.

According to one embodiment of the invention, wherein the second hydraulic cylinder is a lift cylinder, the method may further comprise: controlling the lift cylinder to lower an implement of the working machine; controlling the return valve block to provide the return flow from the lift cylinder to the input side of the first hydraulic machine; and if the pressure from the lift cylinder is higher than the pressure requested from the first hydraulic machine, controlling the first hydraulic machine to recuperate energy by driving the first electric machine as a generator, wherein a pressure drop over the first hydraulic machine is controlled to be the difference between the pressure from the lift cylinder and the requested pressure.

According to one embodiment of the invention, in a system comprising a cylinder main control valve arranged between the respective hydraulic cylinder and the return valve block, the method may further comprise: controlling the main control valve and the return valve block to allow a return flow through the main control valve and through the return valve block to the second return line; controlling the second hydraulic machine to provide a pressure in the second return line to achieve a predetermined minimum pressure drop over the main control valve; and if a return pressure of the hydraulic cylinder increases above a predetermined maximum pressure, controlling the second hydraulic machine to reduce the pressure in the second return line and controlling the main control valve to maintain a requested flow through the valve as before the reduction of pressure in the return line.

According to one embodiment of the invention, wherein the second hydraulic cylinder is a lift cylinder and the third hydraulic cylinder is a tilt cylinder, the method may further comprise: controlling the hydraulic system to simultaneously operate the lift cylinder and the tilt cylinder; determining a required supply pressure for each of the lift cylinder and the tilt cylinder; controlling the return valve block to connect the return flow of the one of the lift cylinder and the tilt cylinder requiring the lowest supply pressure to the high-pressure side of the second hydraulic machine; and controlling the second hydraulic machine to provide a pressure on the high-pressure side such that the lift cylinder and the tilt cylinder require the same supply pressure.

According to one embodiment of the invention, the method may further comprise: detecting a malfunction of the first hydraulic machine and/or of the first electric machine; controlling the return valve block to connect all return flows from the second and third hydraulic cylinders to the low-pressure side of the second hydraulic machine; and controlling the second hydraulic machine to provide a supply pressure requested from the first hydraulic machine to the input side of the first hydraulic machine. Thereby a further advantage of the described system is that it can be operated to provide redundancy in the hydraulic system, meaning that if the first hydraulic machine should malfunction, the hydraulic system can still be operated by means of the second hydraulic machine, even if it may be at reduced capacity. This may help an operator to finish a task in a safe manner and to reach a service location without the need for additional assistance or on-site repairs.

According to one embodiment of the invention, the method may further comprise controlling operation of the second hydraulic machine based on properties of a flow in the third return line. In particular, the second machine may be controlled to operate at a speed required to provide a requested pressure at the high-pressure side based on a flow in the third return line. In situations when there is no flow in the second return line, and where the second hydraulic machine is requested to provide a flow to the input side of the first hydraulic machine, the second hydraulic machine draws hydraulic fluid from the tank which often is at low-pressure, for example atmospheric pressure. It is however also possible to use a pressurized tank, but for the described embodiment to be advantageous, it is required that the pressure of the third return line is higher than the pressure in the tank. The second hydraulic machine can be assumed to have a certain capacity when pumping fluid which is at low-pressure. However, if a pressurized flow of hydraulic fluid is available in the third return line which is connected to the low-pressure side of the second hydraulic machine, the capacity of the hydraulic machine is increased. Alternatively, if a flow through the third return line is available, the same capacity can be achieved but with a smaller hydraulic machine which is advantageous since it both reduced cost and since a smaller volume is required for installation.

There is also provided a computer program comprising program code means for performing the steps of any of the aforementioned embodiments when the program is run on a computer, and a computer readable medium carrying a computer program comprising program code means for performing the steps of any of the aforementioned embodiments when the program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3 is a flow chart outlining steps of a method according to an embodiment of the invention, FIG. 4 is a flow chart outlining steps of a method according to an embodiment of the invention.

DETAILED DESCRIPTION OF EXAMPLE EMBODIMENTS OF THE INVENTION

In the present detailed description, various embodiments a method for controlling a hydraulic system according to the present invention are mainly discussed with reference to a hydraulic hybrid system in a wheel loader, where the hydraulic consumers are illustrated as hydraulic cylinders. It should however be noted that this by no means limits the scope of the present invention since the described hydraulic system is equally applicable in other application and for other types of working machines.

Figure 1:
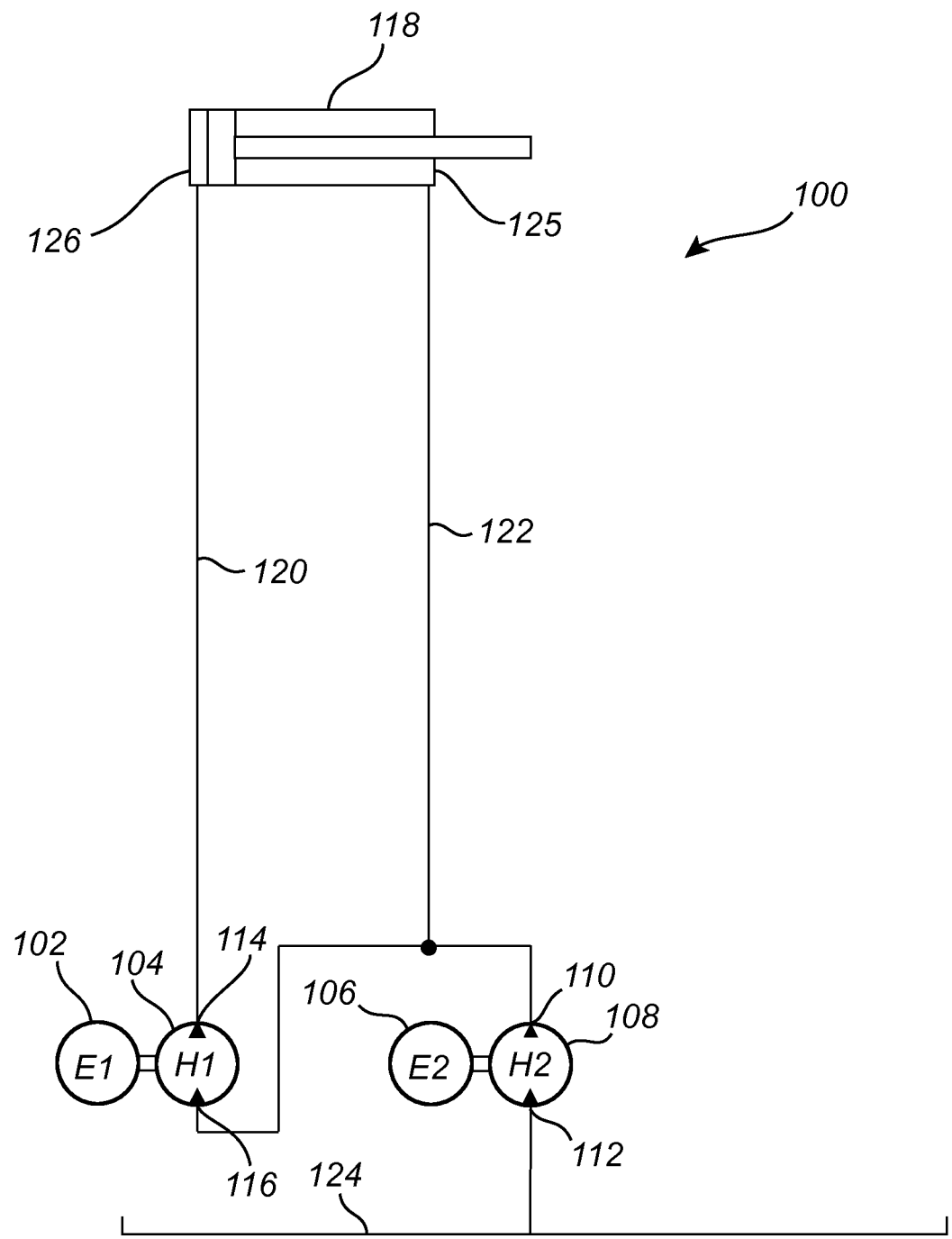
FIG. 1 is a schematic illustration of a hydraulic system configured to perform a method according to an embodiment of the invention.

FIG. 1 schematically illustrates a hydraulic system 100 for a working machine. The hydraulic system 100 comprises a first electric machine 102 (E1) connected to a first hydraulic machine 104 (H1) and a second electric machine 106 (E2) connected to a second hydraulic machine 108 (H2), wherein a high-pressure side 110 of the second hydraulic machine 108 is connected to an input side 116 of the first hydraulic machine 104. The first and second hydraulic machines 104, 108 are here illustrated as fixed displacement hydraulic machines. However, it is equally possible to operate the described system with variable displacement hydraulic machines. If variable displacement hydraulic machines are used, it is further needed to provide control signals to the hydraulic machines to control the pressure provided.

The hydraulic system 100 further comprises at least one hydraulic consumer 118 hydraulically coupled to an output side 114 of the first hydraulic machine 104 via a supply line 120 and configured to be powered by the first hydraulic machine 104. The hydraulic consumer 118 is here represented by a hydraulic cylinder 118 having a piston side 126 connected to the output side 114 of the first hydraulic machine 104 and a piston rod side 125 which is connected to a first return line 122 hydraulically coupling the hydraulic consumer 118 to an input side 116 of the first hydraulic machine 104. The hydraulic cylinder may be any type of hydraulic cylinder used in a working machine, such as e.g. a steering cylinder, a lift cylinder or a tilt cylinder. Moreover, the described hydraulic system 100 may comprise e.g. valves, pressure detectors and the like which are commonly available and well known to the skilled person.

In the described hydraulic system, the method comprises detecting a pressurized return flow from the hydraulic consumer 118 through the first return line 122 and controlling the second hydraulic machine 108 to maintain a pressure in the first return line at a pressure level higher than a predetermined minimum pressure level. The predetermined minimum pressure level may for example be 15 bar.

The general concept of the described method and system, which will be described with reference to various examples in the following, is that the return line 122 is provided to the high-pressure side 110 of the second hydraulic machine 108 which controls the pressure of the return line. If the flow from the return line 122 is higher than what is needed by the first hydraulic machine 104 to supply the hydraulic consumer 118, the pressure of the return line will be increased such that energy can be recuperated in the second hydraulic machine 108 by allowing a flow through the second hydraulic machine 108 to the hydraulic fluid supply 124, thereby powering the second electric machine 106.

The hydraulic fluid supply 124 is here illustrated as a hydraulic tank 124. However, it is also possible to provide hydraulic fluid from a low pressure return flow as will be discussed in the following, from a hydraulic feeder pump or from a hydraulic accumulator.

If on the other hand the flow from the return line 122 is lower than what is needed by the first hydraulic machine 104, the pressure of the return line 122 is decreased and the second hydraulic machine 108 is controlled to increase the pressure of the return line 122 by providing a pressurized flow of hydraulic fluid from the tank 124 to the return line 122. This means that the flow balance of the system, and in particular to the input side 116 of the first hydraulic machine 104, is maintained.

The method further comprises controlling the second hydraulic machine 108 is to provide a flow of hydraulic fluid from the tank 124 to the input side 116 of the first hydraulic machine 104 if a requested flow from the first hydraulic machine 104 exceeds a flow of the first return line 122, and to recuperate energy if the requested flow from the first hydraulic machine 104 is lower than the flow of the first return line 122. The requested flow from the first hydraulic machine 104 may based on a requested function from a vehicle operator, such as turning the wheel loader, lifting a load, or any other operation requiring hydraulic power. The request is translated into a flow and a pressure from the first hydraulic machine 104 and if there is a flow of having sufficient pressure available in the first return line 122, the flow can be used by the first hydraulic machine 104. In another scenario, if there is a flow in the first return line 122 but not a corresponding need for the flow, the flow can be directed through the second hydraulic machine 108 which powers the second electric machine 106 to act as a generator. The generated energy may for example be stored in an electrical energy storage or used for other functions of the working machine.

The first hydraulic machine 104 is further controlled to recuperate energy if a requested pressure from the first hydraulic machine 104 is lower than a pressure in the first return line 122.

Figure 2:
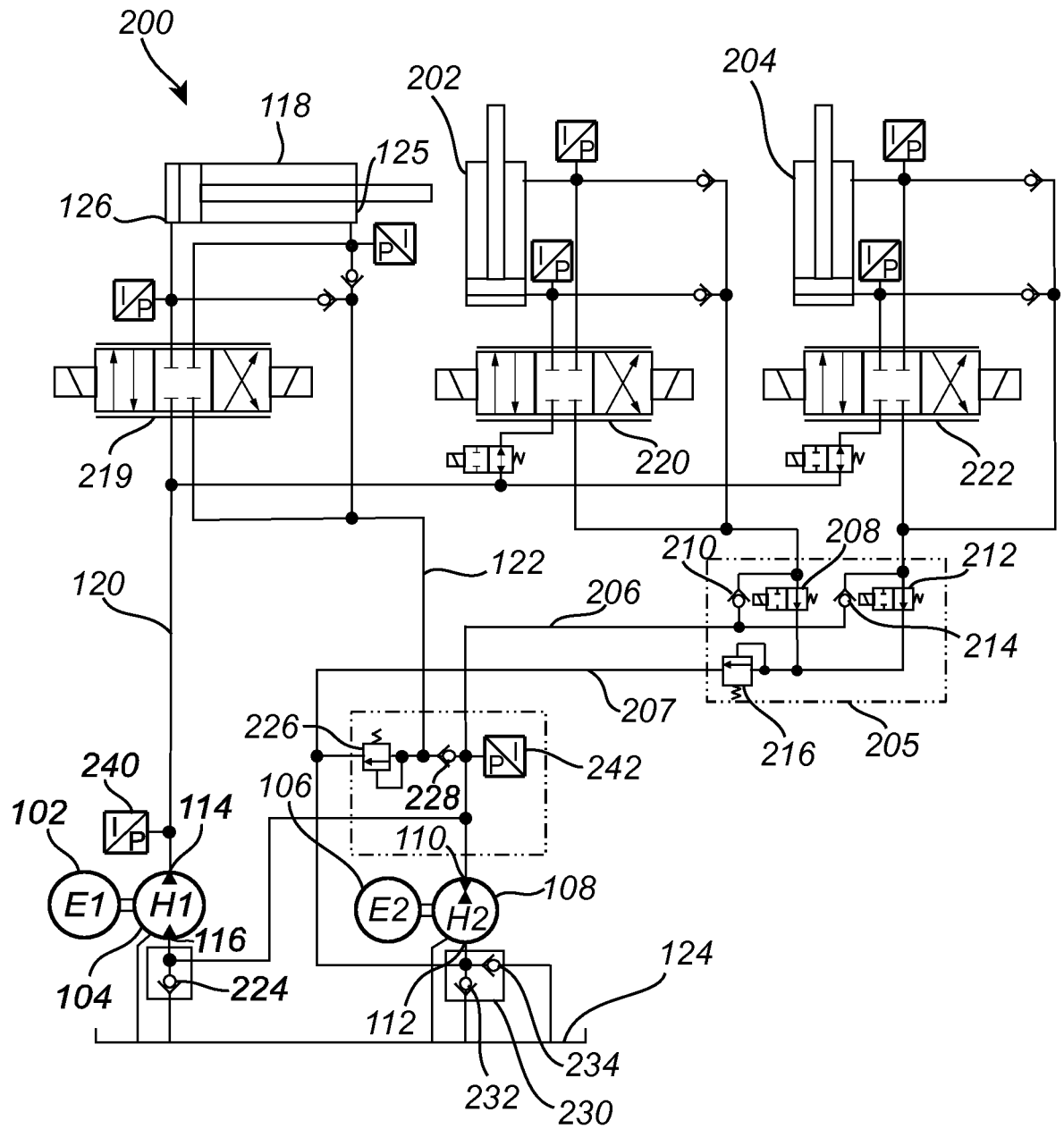
FIG. 2 is a schematic illustration of a hydraulic system configured to perform a method according to an embodiment of the invention.

FIG. 2 illustrates a hydraulic system 200 wherein the at least one hydraulic consumer comprises a first cylinder 118 connected to the first return line 122 and wherein the hydraulic system 200 further comprises a second hydraulic cylinder 202 and a third hydraulic cylinder 204 both connected to a return valve block 205. The return valve block 205 is configured and arranged to control the return flow direction from the second and third hydraulic cylinders 202, 204 to the second hydraulic machine 108. This is achieved by the return valve block 205 being coupled to a second return line 206 connected to the input side 116 of the first hydraulic machine 104 and to the high-pressure side 110 of the second hydraulic machine 108, the return valve block 205 being further coupled to a third return line 207 connected to the low-pressure side 112 of the second hydraulic machine 108.

The hydraulic system further comprises first, second and third cylinder main control valves 219, 220, 222, where the second and third cylinder main control valves 220, 222 are arranged between the respective second and third hydraulic cylinder 202, 204 and the return valve block 205. In the present description, the main control valves 219, 220, 222 are configured to operate with a minimum pressure drop in order to enable operation of the valves, here the pressure drop is at least 15 bar. In the system 200 comprising the cylinder main control valves 220, 222, where a main control valve 220, 222 and the return valve block 205 are controlled to allow a return flow through the main control valve 220, 222 and through the return valve block 205 to the second return line 206, the second hydraulic machine 108 may be controlled to provide a pressure in the second return line 206 to achieve a predetermined minimum pressure drop over the main control valve 220, 222, such as at least 15 bar; and if a return pressure of the hydraulic cylinder 202, 204 increases above a predetermined maximum pressure, the second hydraulic machine 108 can be controlled to reduce the pressure in the second return line 204 while the main control valve 220, 222 is controlled to maintain a requested flow through the valve 220, 222 as before the reduction of pressure in the return line 206. Thereby, a pressure limiting function is provided for the hydraulic cylinders 202, 204 in that the pressure drop over the valves 220, 222 may be increased to prevent that the pressure in the cylinder 202, 204 exceeds a maximum allowed pressure value. The predetermined maximum pressure may for example be 310 bar.

In the present description, the return valve block 205 comprises a first valve arrangement comprising a first on/off valve 208 and a first return check valve 210 and a second valve arrangement comprising a second return check valve 214 and a second on/off valve 212

The return valve block 205 can be controlled so that the return flow to the tank 124 has a certain pressure determined by the pressure limiter 216, such as 5 bar. If the flow is instead controlled to go to the high-pressure side 110 of the second hydraulic machine 108 the pressure will be set by the second hydraulic machine 108. An advantage of the described return valve block 205 is that it can easily be extended with additional valves to accommodate for additional hydraulic consumers.

Moreover, the return valve block 205 is advantageously controlled so as to optimize the energy efficiency of the hydraulic system 200, and several different control strategies are feasible. The return valve block 205 may for example be controlled based on a detected input requesting an operation of the hydraulic system. The return valve block 205 may also be controlled to allow a return flow to the high-pressure side 110 of the second hydraulic machine 108 from the hydraulic cylinder having the return flow with the highest pressure, from the hydraulic cylinder having the highest volume of hydraulic fluid to be ejected and/or from the hydraulic cylinder estimated to provide the highest energy.

In FIG. 2, it is further illustrated that the hydraulic system 200 comprises first pressure detection means 240 arranged to determine a pressure in the supply line 120 and second pressure detection means 242 arranged to determine a pressure in the first return line 122. The first and second pressure detection means 240, 242 may for example be pressure sensors arranged in the supply line 120 and first return line 122, respectively.

FIG. 2 further illustrates that the hydraulic system 200 comprises a check valve 224 arranged between the input side 116 of the first hydraulic machine 104 and the hydraulic fluid supply 124, and between the high-pressure side 110 of the second hydraulic machine 108 and the hydraulic fluid supply 124, wherein the check valve 224 is configured to allow the first hydraulic machine 104 to access hydraulic fluid from the hydraulic fluid supply 124. As illustrated in FIG. 2, the check valve 224 is arranged to prevent hydraulic fluid from flowing from the input side 116 of first hydraulic machine 104, and also from the first return line 122 and the high-pressure side 110 of the second hydraulic machine 108, to the tank 124. Preferably, the first hydraulic machine 104 receives all of the required flow from the second return line 206 and/or from the second hydraulic machine 108. However, there may be situations where the flow to the input side of the first hydraulic machine 104 is not sufficient, such as if the second hydraulic machine 108 malfunctions or if the return flow is too low. In such situations, the first hydraulic machine can draw from the tank 124 via the check valve 224, even though the total flow which can be provided by the first hydraulic machine 104 will be reduced and the maximum possible rpm may also be reduced.

The first return line 122 is further connected to a pressure limiter 226 which in turn is connected to the tank 124. In FIG. 2, the pressure limiter 226 is connected to the third return line 207 meaning that the first return line 122 transitions to the third return line 207 at the pressure limiter 226. The first return line 122 is further connected to a check valve 228 which in turn connects to the second return line 206, thereby allowing a flow from the first return line 122, via the check valve 228, and on to the input side 116 of the first hydraulic machine 104 and the high-pressure side 110 of the second hydraulic machine 108. The check valve 228 is arranged to allow a flow from the first return line 122 to the second return line 206 assuming that the pressure in the first return line 122 is higher than the pressure of the second return line 206. If the pressure in the second return line 206 is higher than the pressure of the first return line 122, the check valve 228 prevents a flow from the second return line 206 to the first return line 122. A threshold pressure of the pressure limiter 226 may also be controlled to allow energy recuperation from the first hydraulic cylinder via the check valve 228, which in practice may be achieved by increasing the pressure limit of the pressure limiter 226.

Furthermore, the pressure limiter 226 illustrated in FIG. 2 allows a flow from the second return line 206 to the tank 124 if the pressure in the first return line 122 is higher than the pressure in the second return line 206. The pressure in the first return line 122 must also be higher than the pressure level set by the pressure limiter 226 to produce a flow through the pressure limiter 226. The pressure limiter provides a counter pressure for the first hydraulic cylinder which is desirable in applications where a hydraulic cylinder needs a counter pressure to operate correctly. For example, if the first hydraulic cylinder 118 is a steering cylinder in a wheel loader, a counter pressure of approximately 20 bar may be desirable in order to provide the desirable steering function.

Moreover, the pressure limiter 226 is connected to the low-pressure side 112 of the second hydraulic machine 108 and to the tank 124 via a check valve arrangement 230 comprising a first check valve 232 allowing the second hydraulic machine 108 to access hydraulic fluid from the tank 124 and a second check valve 234 allowing a flow of hydraulic fluid from the pressure limiter 226 to the tank 124. Accordingly, the first check valve 232 prevents a flow in the third return line 207 from going directly to tank. The second check valve 234 can also be assumed to have an opening pressure which allows the second hydraulic machine 108 to utilize a flow in the third return line 207. The opening pressure may for example be in the range of 1-2 bar. Moreover, the pressure limiter 226 is connected to the tank via the second check valve 234. Thereby, a flow through the pressure limiter 226 can be used by the second hydraulic machine 108 or it can be provided to the tank 124 via the second check valve 234.

In the present description, the first hydraulic cylinder 118 is a steering cylinder, the second hydraulic cylinder 202 is a lift cylinder and the third hydraulic cylinder 204 is a tilt cylinder of a working machine.

FIG. 3 is a flow chart outlining the general steps of a method according to an embodiment of the invention, wherein the method comprises detecting 300 a return flow from the first hydraulic cylinder 118 through the first return line 122 and controlling 302 the second hydraulic machine 108 to maintain a pressure in the first return line 122 at a pressure level higher than a predetermined minimum pressure level. The minimum pressure level may for example be 15 bar. The pressure of the return line may for example drop due to internal system leakage, or if any other hydraulic consumer is connected to the return line. There may also be other functions drawing hydraulic fluid from the return line, such as reconditioning and/or cooling systems.

Figure 5:
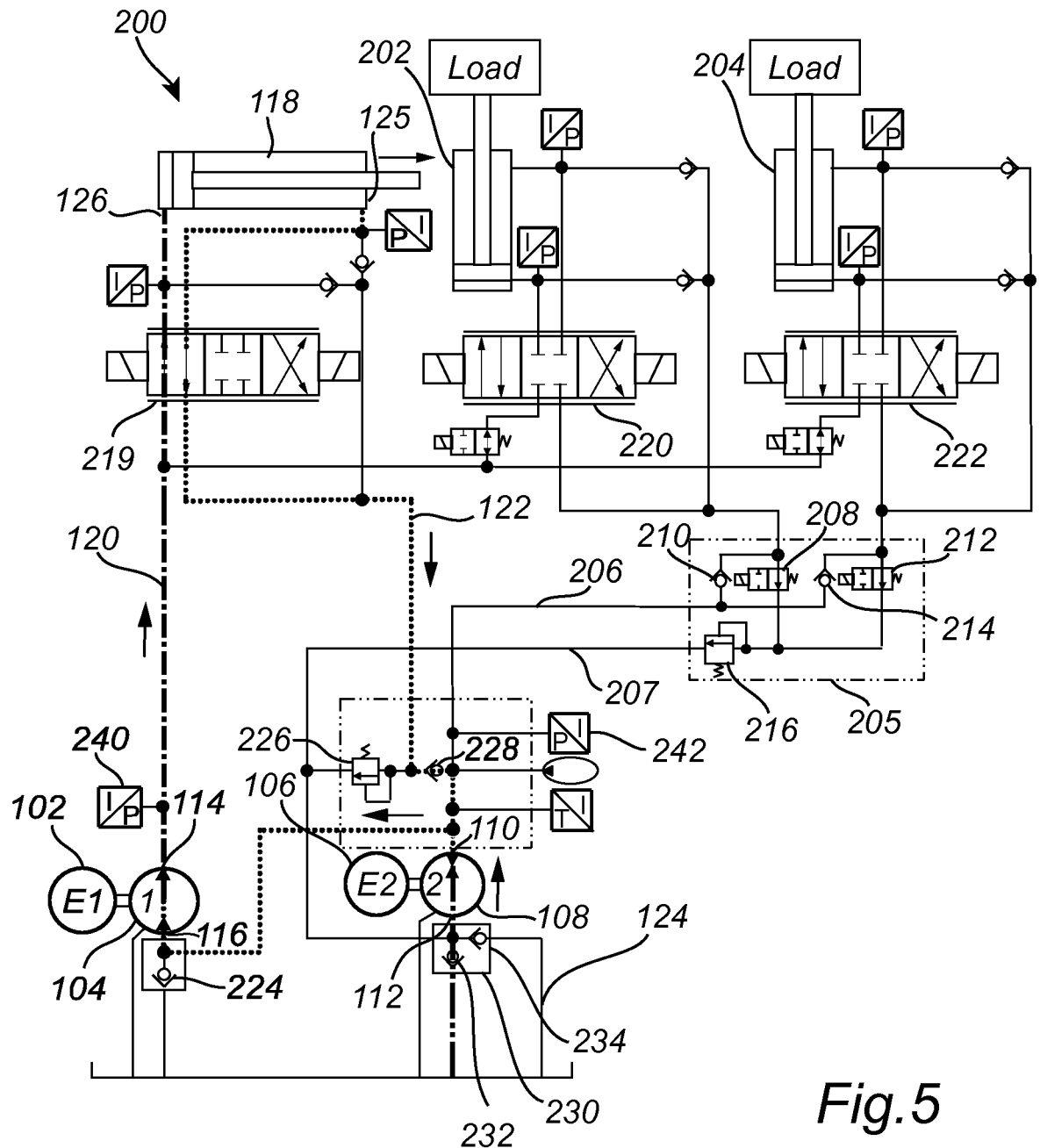
FIG. 5 is a schematic illustration of a hydraulic system configured to perform a method according to an embodiment of the invention.

The embodiment illustrated by the flow chart of FIG. 4 will be described with reference to FIG. 5 illustrating the various flows in the hydraulic system 200. FIG. 5 illustrates an example scenario for the hydraulic system illustrated in FIG. 2, where the piston rod of the steering cylinder 118 is being extended, resulting in a flow from the piston rod side 125 of the steering cylinder through the first main control valve 219 to the first return line 122. The method comprises determining 400 a requested supply pressure from the first hydraulic machine 104 and; if 402 a requested supply pressure from the first hydraulic machine 104 exceeds a return pressure of the first return line 122, and if 404 the return flow of the first return line 122 is lower than the supply flow required by the first hydraulic machine 104, controlling 406 the second hydraulic machine 108 to provide a pressurized flow of hydraulic fluid from the tank 124 to the input side 116 of the first hydraulic machine 104. It is thus the second electric machine 106 which drives the second hydraulic machine 108 to act as a pump providing a pressurized flow from the high-pressure side 110 of the second hydraulic machine 108. In the present example, the return flow is smaller than the required supply flow since the return flow comes from the piston rod side 125 having a smaller volume than the piston side 126. It should be noted that the pressure levels indicated in the figures are provided as illustrative examples and should as such not be construed as limiting.

Figure 6:
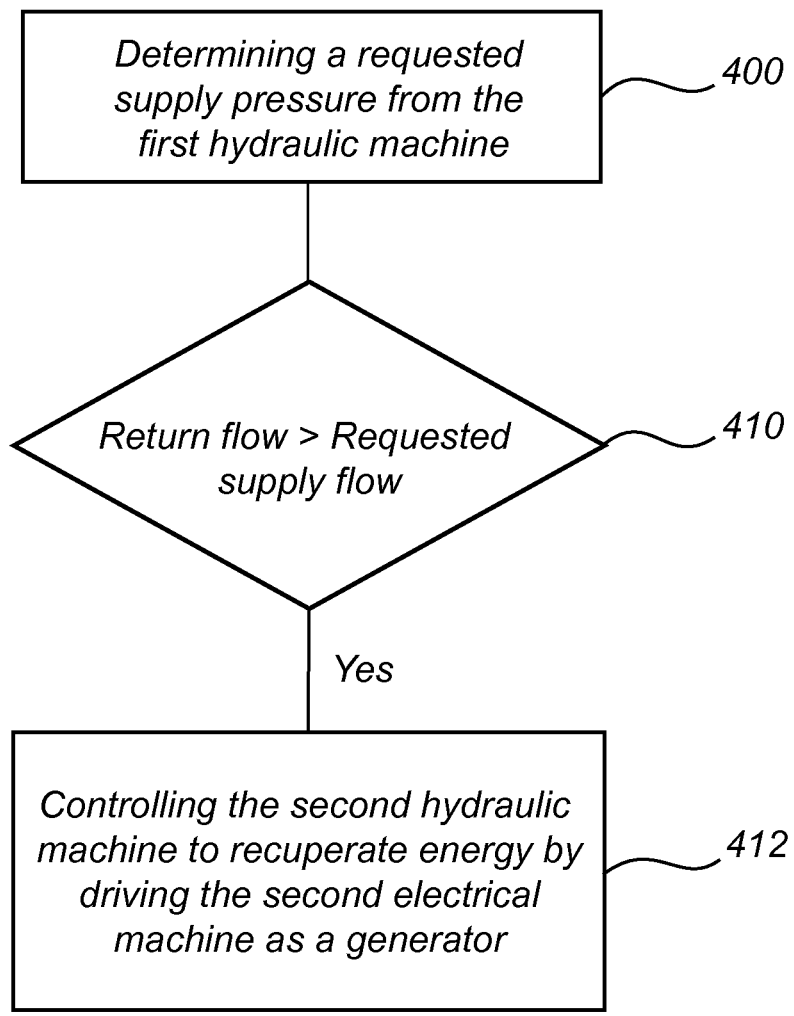
FIG. 6 is a flow chart outlining steps of a method according to an embodiment of the invention.
Figure 7:
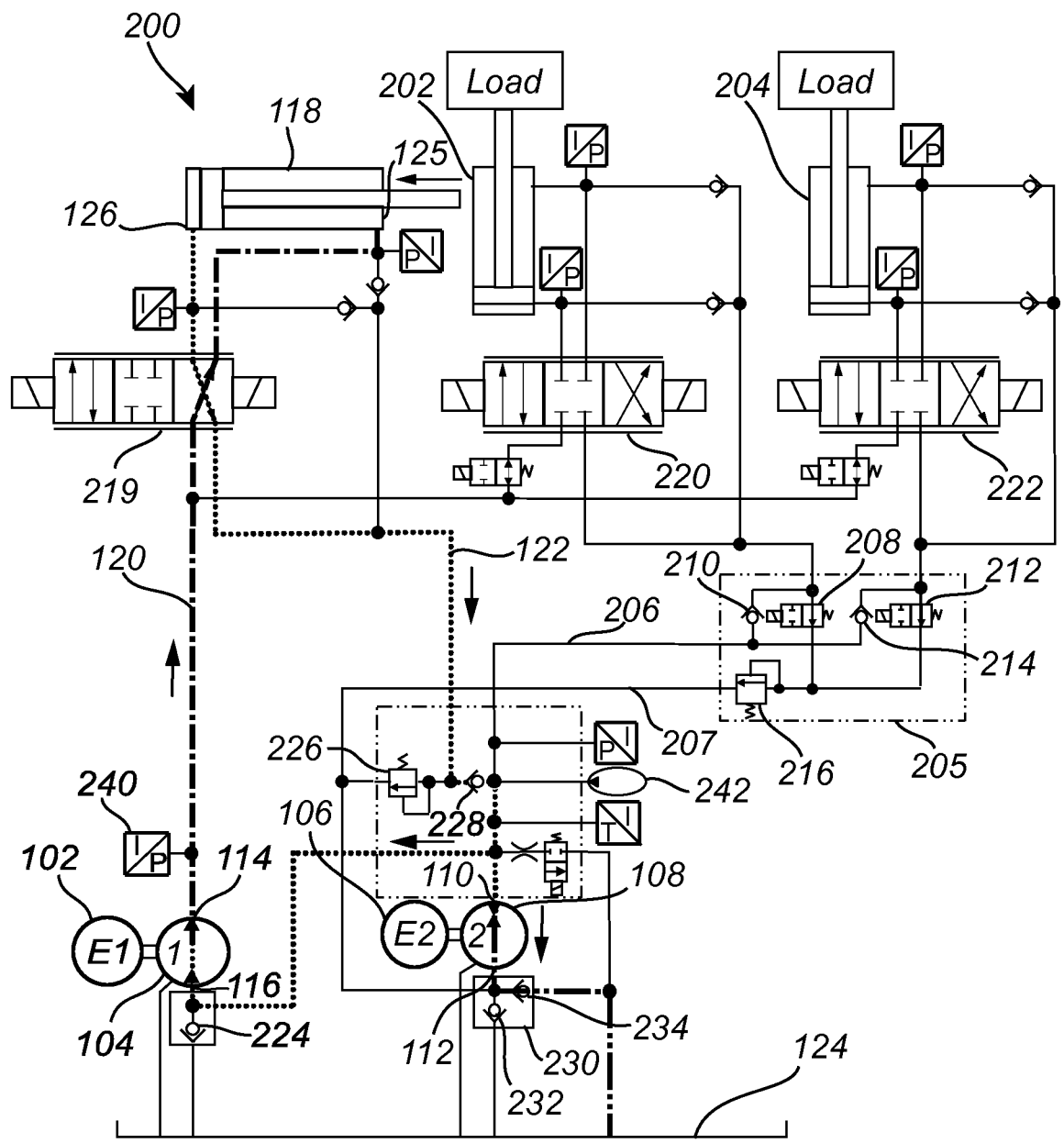
FIG. 7 is a schematic illustration of a hydraulic system configured to perform a method according to an embodiment of the invention.

The embodiment illustrated by the flow chart of FIG. 6 will be described with reference to FIG. 7 illustrating the various flows in the hydraulic system 200.

FIG. 7 illustrates an example scenario for the hydraulic system illustrated in FIG. 2, where the piston rod of the steering cylinder 118 is being retracted, resulting in a flow from the piston side 126 of the steering cylinder 118 through the first main control valve 219 to the first return line 122. This is achieved by changing the position of the first main control valve 219. Accordingly, the situation is reversed compared to what is illustrated in FIG. 5, and the return flow is larger than the required supply flow. The method comprises determining 400 a requested supply pressure from the first hydraulic machine 114; and if 402 a requested supply pressure from the first hydraulic machine 114 exceeds a return pressure of the first return line 122 and if 410 the return flow of the first return line 122 is higher than the supply flow required from the first hydraulic machine 104, controlling 412 the second hydraulic machine 108 to recuperate energy by driving the second electric machine 106 as a generator.

Figures 8, 9:
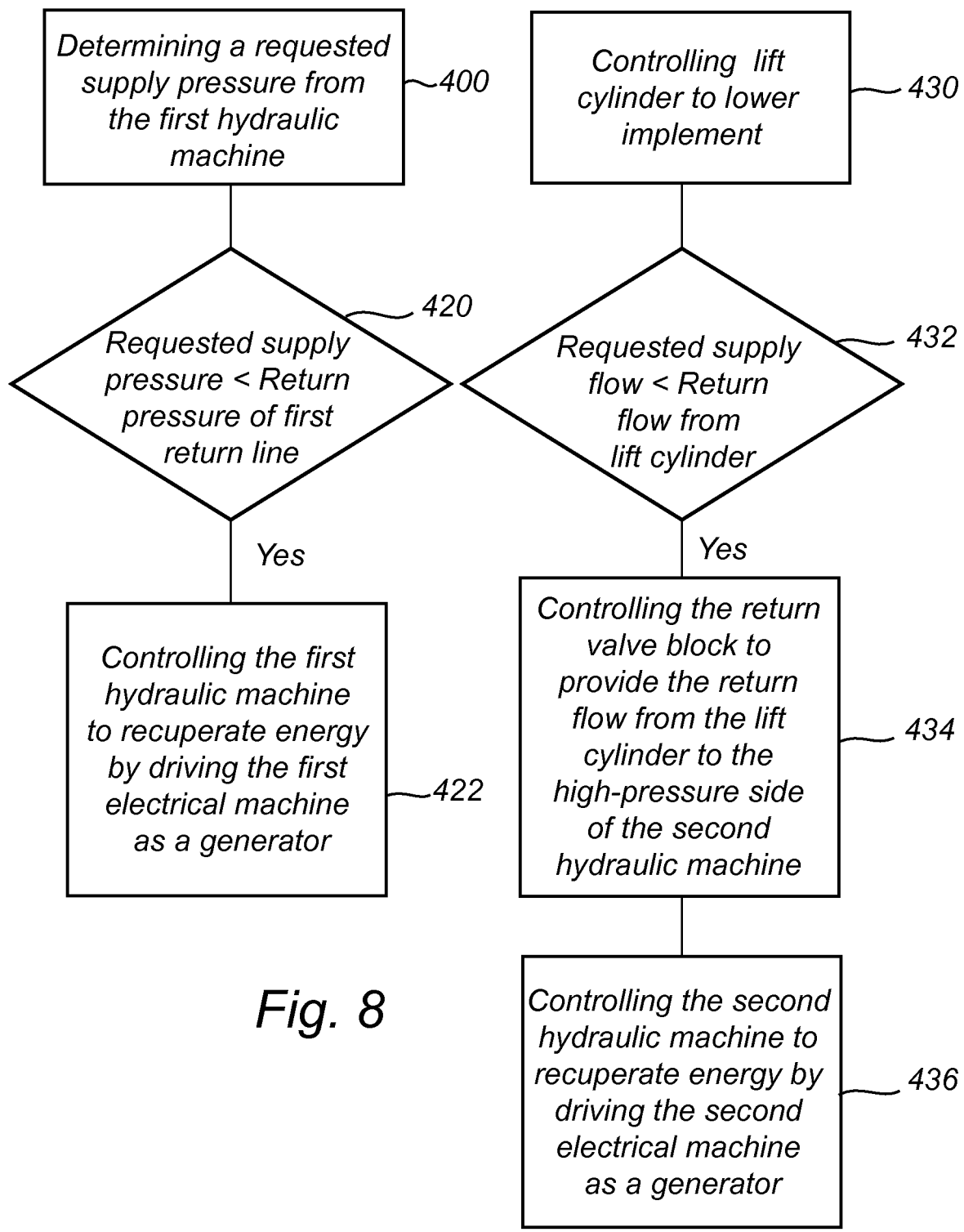
FIG. 8 is a flow chart outlining steps of a method according to an embodiment of the invention.
FIG. 9 is a flow chart outlining steps of a method according to an embodiment of the invention.

FIG. 8 is a flow chart outlining steps of a method according to an embodiment of the invention, the method comprising determining 400 a requested supply pressure from the first hydraulic machine; and if 420 the requested supply pressure from the first hydraulic machine 104 is lower than a return pressure in the first return line 122, controlling 422 the first hydraulic machine 104 to recuperate energy by driving the first electric machine 104 as a generator, wherein a pressure drop over the first hydraulic machine 104 is controlled to be the difference between the pressure in the first return line 122 and the requested pressure.

Figure 10:
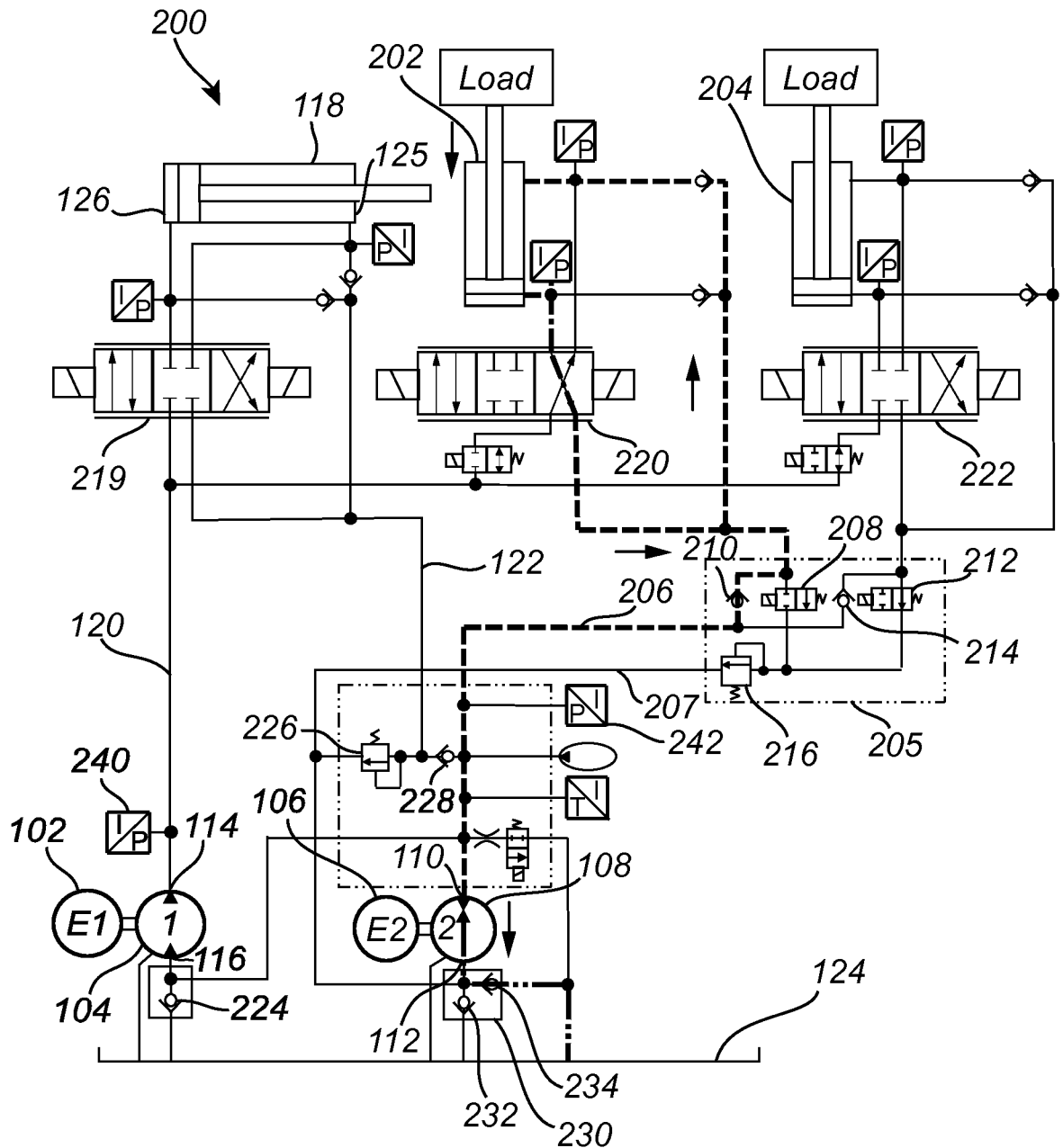
FIG. 10 is a schematic illustration of a hydraulic system configured to perform a method according to an embodiment of the invention.

The embodiment illustrated by the flow chart of FIG. 9 will be described with reference to FIG. 10 illustrating the various flows in the hydraulic system 200. The method comprises controlling 430 the lift cylinder 202 to lower an implement of the working machine; and if 432 the requested supply flow from the first hydraulic machine 104 is lower than the return flow from the lift cylinder 202, controlling 434 the return valve block 205 to provide the return flow from the lift cylinder 202 to the high-pressure side 110 of the second hydraulic machine 108 and controlling 436 the second hydraulic machine 108 to recuperate energy by driving the second electric machine 106 as a generator. In the illustrated example, the return flow from the lift cylinder is the only flow, meaning that the steering and tilt cylinders 118, 204 are inactive, and all of the return flow thus goes through the second hydraulic machine 108 for energy recuperation. In the illustrated example, there is no supply flow required from the first hydraulic machine 104. However, other consumers may be operated simultaneously with the lowering of the implement, thereby requiring a supply flow from the first hydraulic machine 104. Another scenario where a supply flow from the first hydraulic machine 104 is required is if the implement is being pushed down, for example to lift the front end of the working machine.

Figure 11:
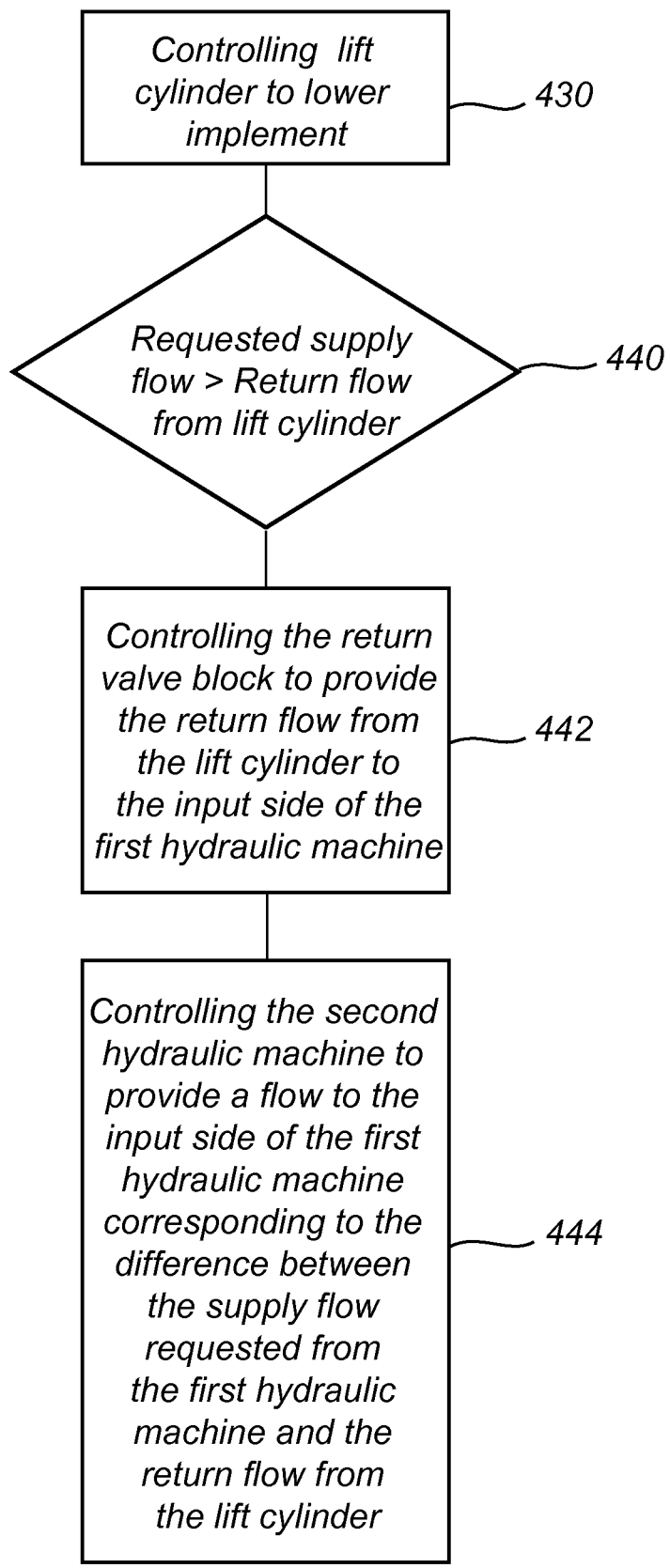
FIG. 11 is a flow chart outlining steps of a method according to an embodiment of the invention.
Figure 12:
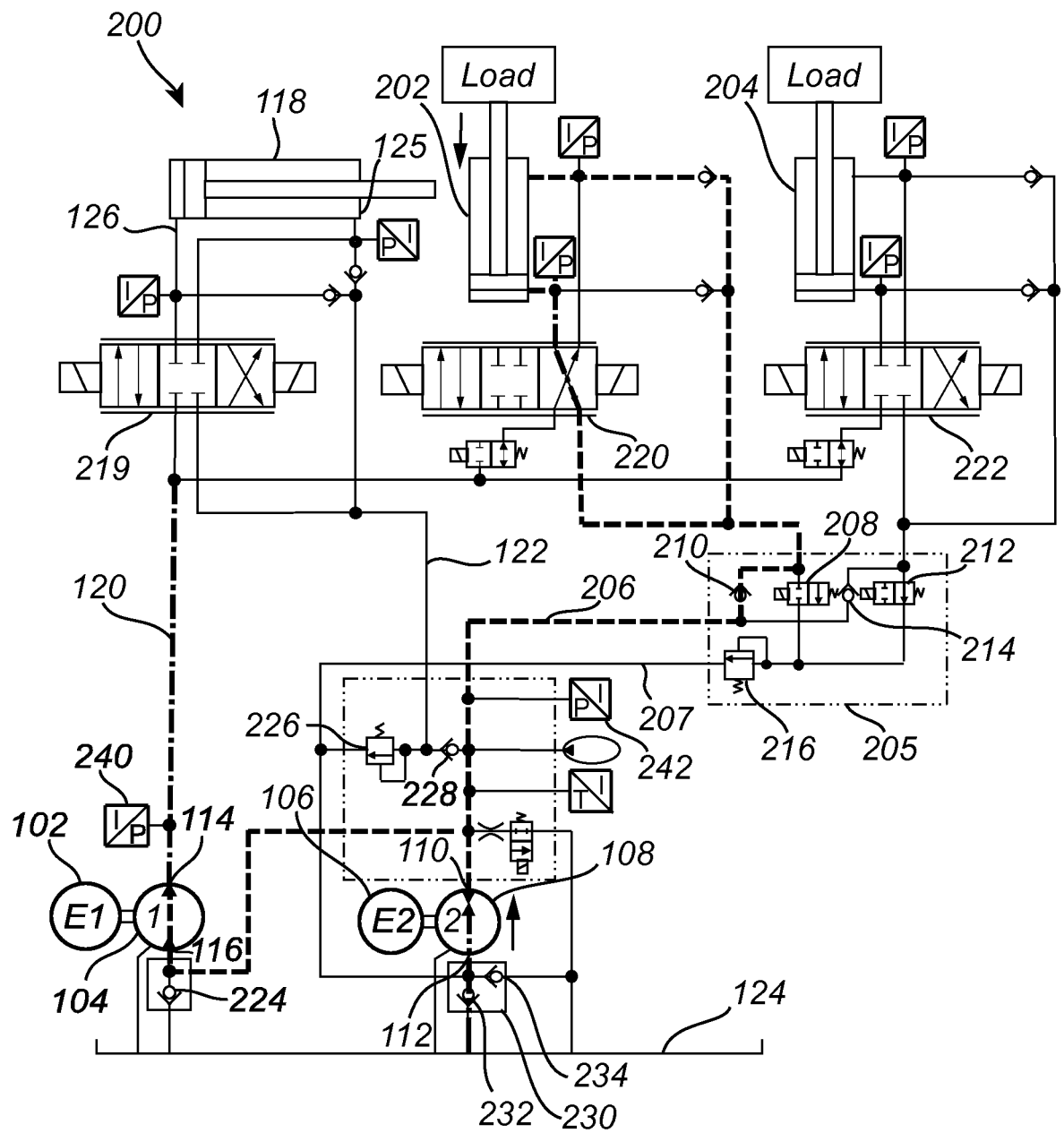
FIG. 12 is a schematic illustration of a hydraulic system configured to perform a method according to an embodiment of the invention.

The embodiment illustrated by the flow chart of FIG. 11 will be described with reference to FIG. 12 illustrating the various flows in the hydraulic system 200. The method comprises: controlling 430 the lift cylinder 202 to lower an implement of the working machine; and if 440 the requested supply flow from the first hydraulic machine 104 is higher than the return flow from the lift cylinder 202, controlling 442 the return valve block 205 to provide the return flow from the lift cylinder 202 to the input side 116 of the first hydraulic machine 104 and controlling 444 the second hydraulic machine 108 to provide a flow to the input side 116 of the first hydraulic machine 104 corresponding to the difference between the supply flow requested from the first hydraulic machine 104 and the return flow from the lift cylinder 1. In FIG. 12, it may be either or both of the steering cylinder 118 and the tilt cylinder 204 that requires a supply flow from the first hydraulic machine 104.

Even though FIGS. 9 to 12 describe scenarios where the lift cylinder 202 is operated, the same principles and control methodology is applicable if the tilt cylinder 204, or any other hydraulic actuator connected to the return valve block 205 of the hydraulic system 200, is being operated.

Figure 13:
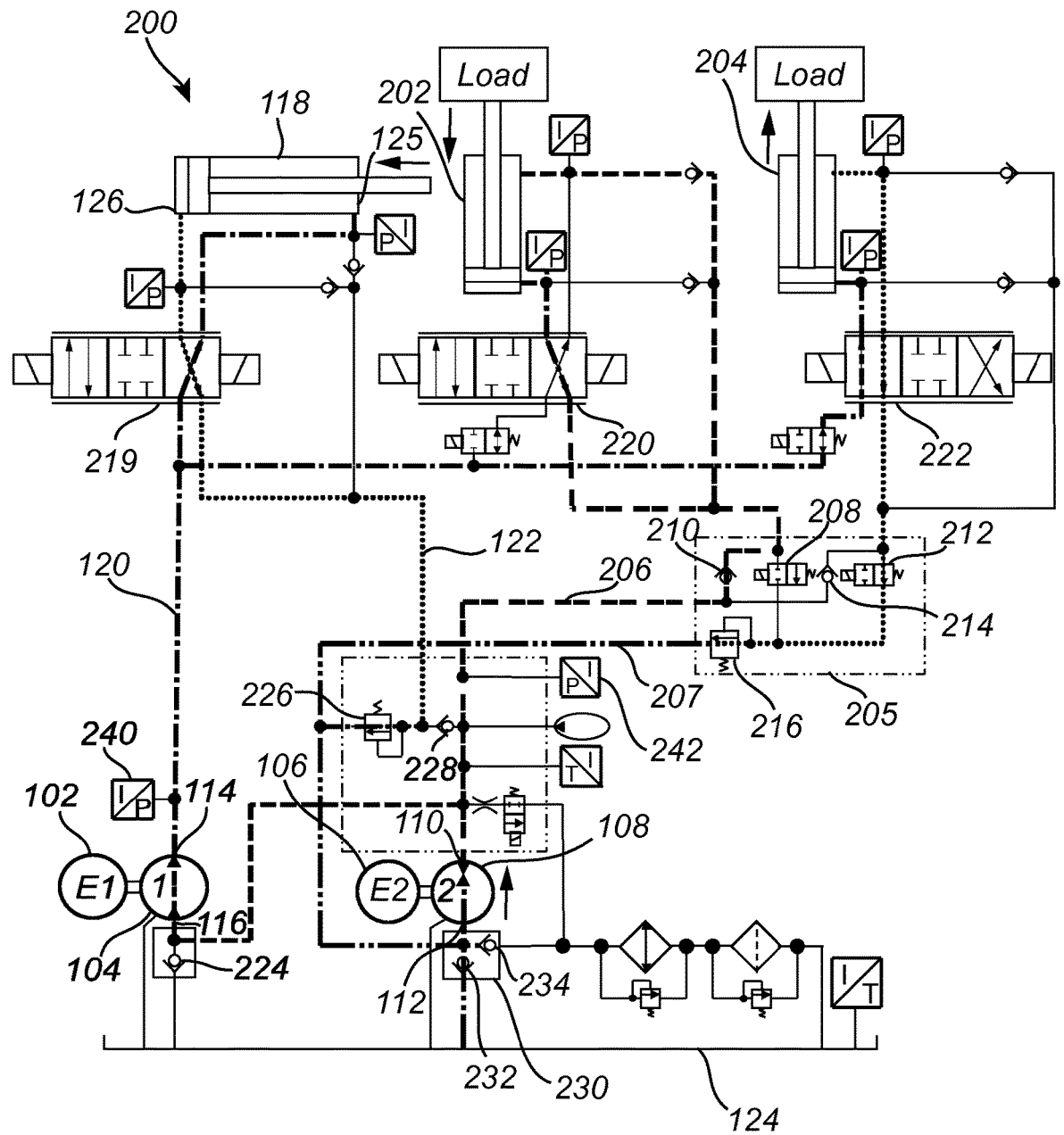
FIG. 13 is a schematic illustration of a hydraulic system configured to perform a method according to an embodiment of the invention.

FIG. 13 schematically illustrates a scenario where several hydraulic functions are operated simultaneously, and in particular a scenario where pressurized return flow is available from several functions. In the illustrated example, the pressure of the return flow from the lift cylinder 202 is higher than the pressure of the return flow from the tilt cylinder 204. Therefore, the return valve block 205 is controlled to close the first on/off valve 208 such that the flow from the lift cylinder goes through the first return check valve 210 and further on through the second return line 206 to the high-pressure side of the second hydraulic machine 108. The second on/off valve 212 is open such that the flow from the tilt cylinder 204 goes through the second on/off valve 212 and further on to the low-pressure side 112 of the second hydraulic machine 108 where the flow is either used by the second hydraulic machine 108 if required or directed to tank 124 via the check valve 234 if no additional flow is required from the second hydraulic machine 108.

It should be noted that even though the example illustrated by FIG. 13 is based on energy recuperation from the hydraulic cylinder having the highest pressure, it is equally possible to use other control parameters when deciding from which of the hydraulic cylinders energy is to be recuperated.

Figure 14:
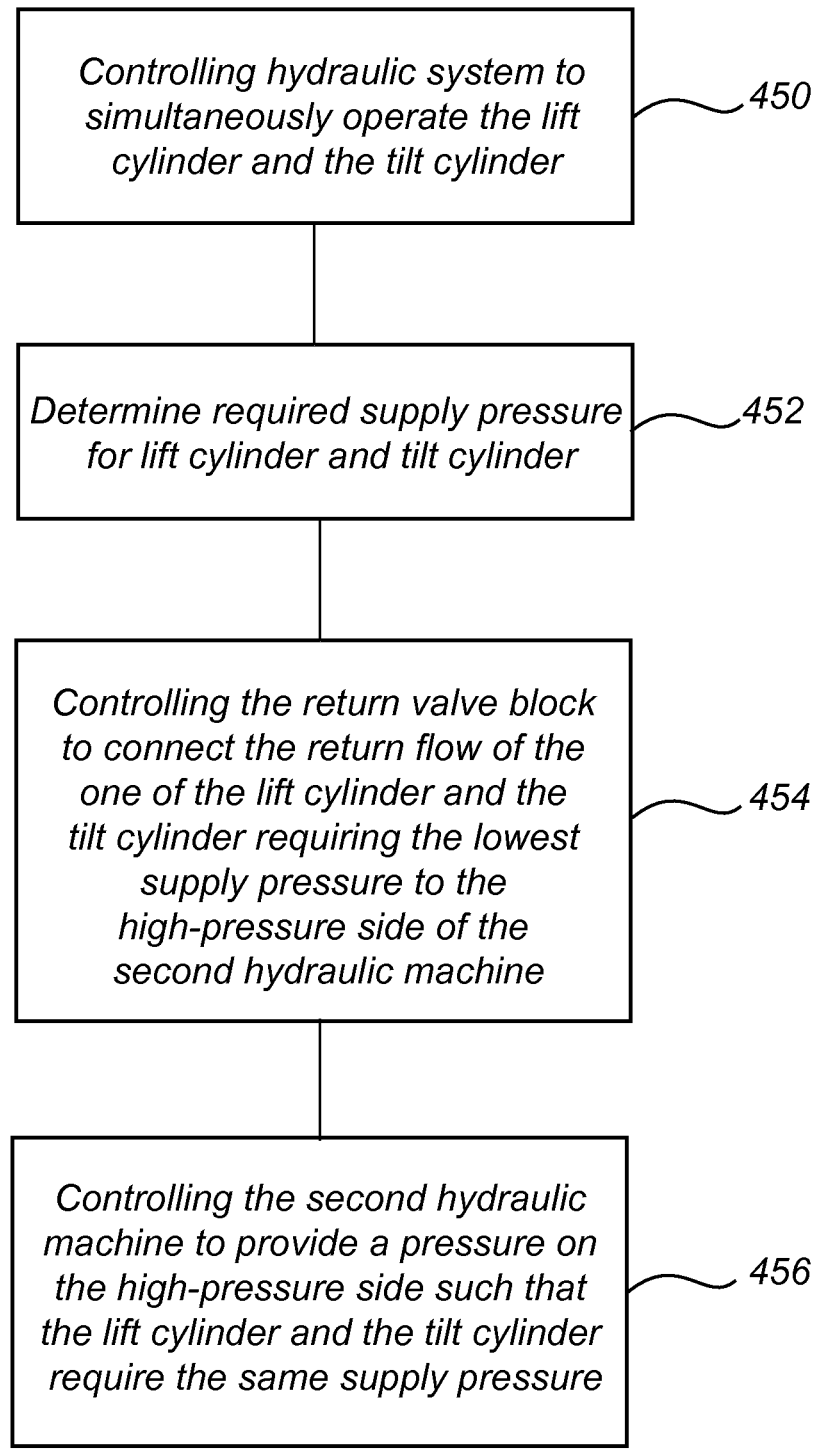
FIG. 14 is a flow chart outlining steps of a method according to an embodiment of the invention.
Figure 15:
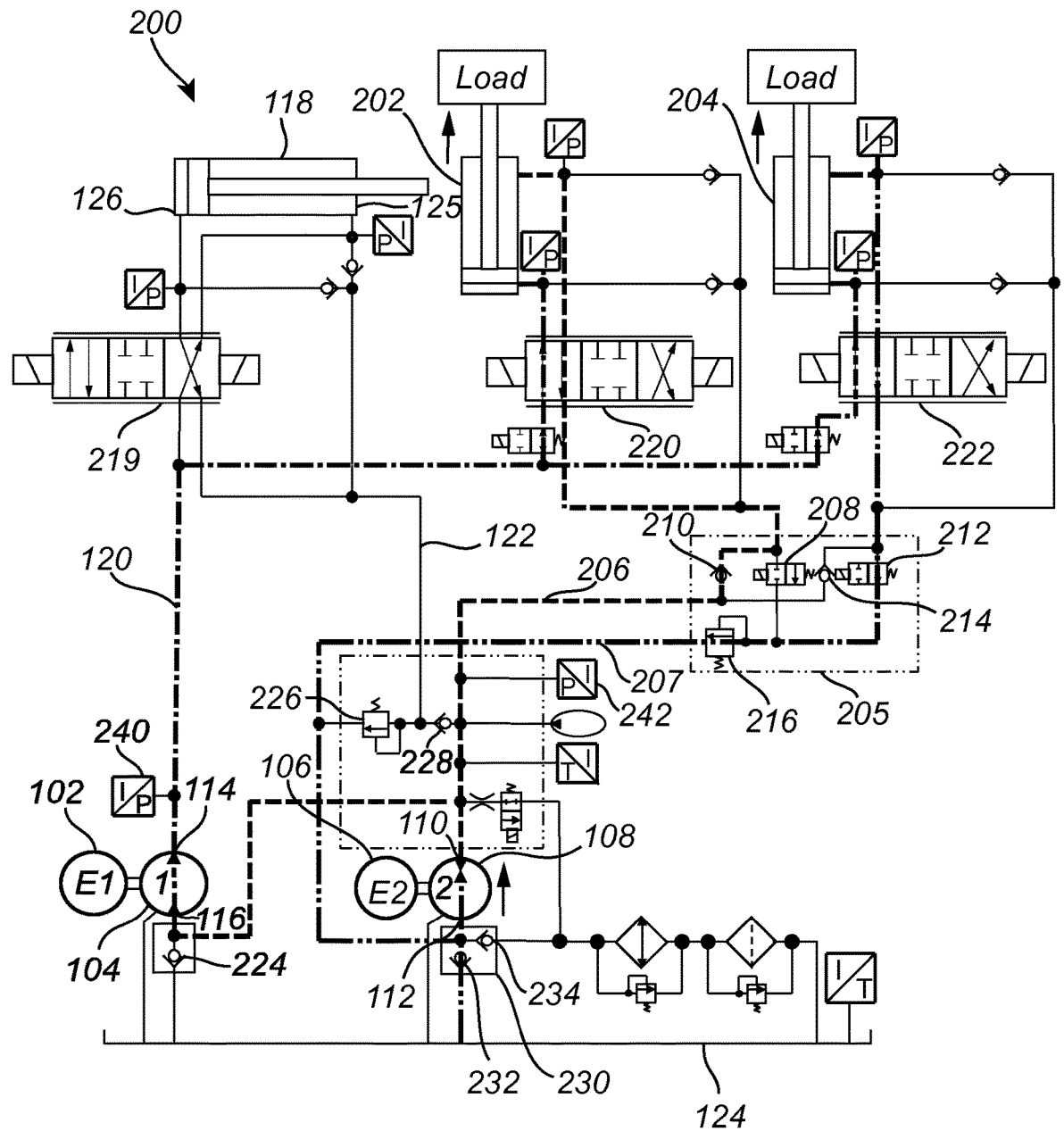
FIG. 15 is a schematic illustration of a hydraulic system configured to perform a method according to an embodiment of the invention.

The embodiment illustrated by the flow chart of FIG. 14 will be described with reference to FIG. 15 illustrating a scenario where the hydraulic system 200 is controlled 450 to simultaneously operate the lift cylinder 202 and the tilt cylinder 204. The method further comprises determining 452 a required supply pressure for each of the lift cylinder 202 and the tilt cylinder 204, controlling 454 the return valve block 205 to connect the return flow of the one of the lift cylinder 202 and the tilt cylinder 204 requiring the lowest supply pressure to the high-pressure side 110 of the second hydraulic machine 108; and controlling 456 the second hydraulic machine 108 to provide a pressure on the high-pressure side 110 such that the lift cylinder 202 and the tilt cylinder 204 require the same supply pressure.

In an example scenario, the lift cylinder 202 requires 200 bar supply pressure form the first hydraulic machine 104 and the tilt cylinder requires 100 bar. The first hydraulic machine 104 will then provide a pressure of 15 bar above the maximum pressure to provide a flow, i.e. 215 bar. This will have the effect that the pressure drop from the first hydraulic machine 104 to the lift cylinder 202 will be 15 bar while the pressure drop from the first hydraulic machine 104 to the tilt cylinder will be 115 bar. There will thus be a large pressure drop loss to the tilt cylinder 204. By connecting the tilt cylinder 204 to the high-pressure side 110 of the second hydraulic machine 108 and by increasing the pressure at the high-pressure side 110, the pressure drop over the tilt cylinder 204 can be reduced to e.g. 15 bar. This still allows for energy recuperation of a flow in the second return line by means of the first or second hydraulic machine 104, 108.

In a further embodiment, the second hydraulic machine 108 may advantageously be controlled based on properties of a flow in the third return line 207. The second hydraulic machine 108 may then be controlled to operate at a speed required to provide a requested pressure and flow at the high-pressure side 110 based on a flow in the third return line 207.

Figure 16:
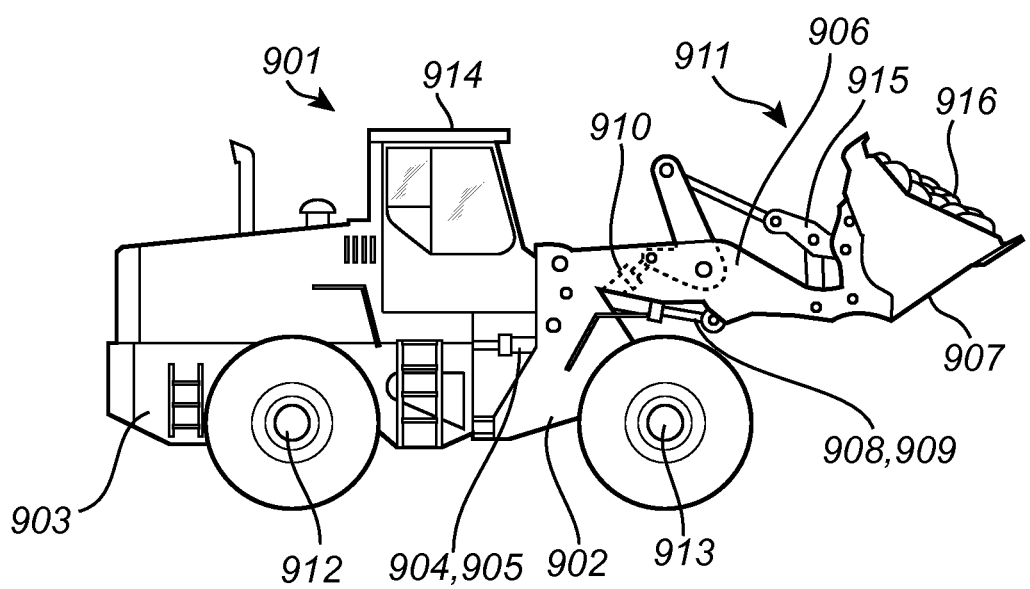
FIG. 16 is a schematic illustration of a working machine comprising a hydraulic system configured to perform a method according to an embodiment of the invention.

FIG. 16 shows a frame-steered working machine in the form of a wheel loader 901. The body of the wheel loader 901 comprises a front body section 902 and a rear body section 903, which sections each has an axle 912, 913 for driving a pair of wheels. The rear body-section 903 comprises a cab 914. The body sections 902, 903 are connected to each other in such a way that they can pivot in relation to each other around a vertical axis by means of two first actuators in the form of hydraulic cylinders 904, 905 arranged between the two sections. The hydraulic cylinders 904, 905 are thus arranged one on each side of a horizontal centerline of the vehicle in a vehicle traveling direction in order to turn the wheel loader 901.

The wheel loader 901 comprises an equipment 911 for handling objects or material. The equipment 911 comprises a load-arm unit 906, also referred to as a linkage, and an implement 907 in the form of a bucket fitted on the load-arm unit 906. A first end of the load-arm unit 906 is pivotally connected to the front vehicle section 902. The implement 907 is pivotally connected to a second end of the load-arm unit 906.

The load-arm unit 906 can be raised and lowered relative to the front section 902 of the vehicle by means of two second actuators in the form of two hydraulic cylinders 908, 909, each of which is connected at one end to the front vehicle section 902 and at the other end to the load-arm unit 906. The bucket 907 can be tilted relative to the load-arm unit 906 by means of a third actuator in the form of a hydraulic cylinder 910, which is connected at one end to the front vehicle section 902 and at the other end to the bucket 907 via a link-arm system 915.

It is to be understood that the present invention is not limited to the embodiments described above and illustrated in the drawings; rather, the skilled person will recognize that many changes and modifications may be made within the scope of the appended claims.

The invention claimed is:

1. A method for controlling a hydraulic system for a working machine, the system comprising:
   a first electric machine connected to a first hydraulic machine, the first hydraulic machine comprising an input side and an output side;
   a second electric machine connected to a second hydraulic machine, the second hydraulic machine comprising a high-pressure side and a low-pressure side, the high-pressure side of the second hydraulic machine being connected to the input side of the first hydraulic machine;
   at least one hydraulic consumer hydraulically coupled to the output side of the first hydraulic machine via a supply line and configured to be powered by the first hydraulic machine; and
   a first return line hydraulically coupling the hydraulic consumer to the input side of the first hydraulic machine and to the high-pressure side of the second hydraulic machine,
   the at least one hydraulic consumer comprising a first hydraulic cylinder connected to the first return line and the hydraulic system further comprising second and third hydraulic cylinders connected to a return valve block configured and arranged to control the return flow direction from the second and third hydraulic cylinders to the second hydraulic machine, the return valve block being coupled to a second return line connected to the input side of the first hydraulic machine and to the high-pressure side of the second hydraulic machine, the return valve block being further coupled to a third return line connected to the low-pressure side of the second hydraulic machine,
   the method comprising:
   detecting a return flow from the hydraulic consumer through the first return line; and
   controlling the second hydraulic machine to maintain a pressure in the first return line at a pressure level higher than a predetermined minimum pressure level; and
   controlling the return valve block based on operating properties of the first, second and/or third hydraulic cylinder such that energy is recovered by the first or second hydraulic machine.

2. The method according to claim 1, further comprising:
   determining a requested supply pressure from the first hydraulic machine; and
   if the return flow of the first return line is lower than the supply flow required by the first hydraulic machine, controlling the second hydraulic machine to provide a pressurized flow of hydraulic fluid from a hydraulic fluid supply to the input side of the first hydraulic machine.

3. The method according to claim 1, further comprising:
   determining a requested supply pressure from the first hydraulic machine; and
   if the return flow of the first return line is higher than the supply flow required from the first hydraulic machine, controlling the second hydraulic machine to recuperate energy by driving the second electric machine as a generator.

4. The method according to claim 1, further comprising:
   determining a requested supply pressure from the first hydraulic machine; and
   if the requested supply pressure from the first hydraulic machine is lower than the pressure in the first return line, controlling the first hydraulic machine to recuperate energy by driving the first electric machine as a generator, wherein a pressure drop over the first hydraulic machine is controlled to be the difference between the pressure in the first return line and the requested pressure.

5. The method according to claim 1, further comprising:
   detecting an input requesting an operation of the hydraulic system; and
   controlling the return valve block to allow a return flow from a predetermined one of the first, second and third hydraulic cylinders based on the requested operation.

6. The method according to claim 1, further comprising:
   estimating a pressure of a return flow for each of the second and third hydraulic cylinder; and
   controlling the return valve block to allow a return flow to the high-pressure side of the second hydraulic machine from the hydraulic cylinder having the return flow with the highest pressure.

7. The method according to claim 1, further comprising:
   estimating a volume of hydraulic fluid to be ejected by each of the second and third hydraulic cylinder; and
   controlling the return valve block to allow a return flow to the high-pressure side of the second hydraulic machine from the hydraulic cylinder having the highest volume of hydraulic fluid to be ejected.

8. The method according to claim 1, further comprising: estimating an energy of the of hydraulic fluid to be ejected by each of the second and third hydraulic cylinder; and controlling the return valve block to allow a return flow to the high-pressure side of the second hydraulic machine from the hydraulic cylinder estimated to provide the highest energy.

9. The method according to claim 8, wherein estimating an energy of the hydraulic fluid to be ejected comprises determining a start position and an end position of each of the first and second hydraulic cylinder for a known work operation of the hydraulic system.

10. The method according to claim 1, wherein the second hydraulic cylinder is a lift cylinder, the method further comprising:
controlling the lift cylinder to lower an implement of the working machine; and
if the requested supply flow from the first hydraulic machine is lower than the return flow from the lift cylinder, controlling the return valve block to provide the return flow from the lift cylinder to the high-pressure side of the second hydraulic machine and controlling the second hydraulic machine to recuperate energy by driving the second electric machine as a generator.

11. The method according to claim 1, wherein the second hydraulic cylinder is a lift cylinder, the method further comprising:
controlling the lift cylinder to lower an implement of the working machine; and
if the requested supply flow from the first hydraulic machine is higher than the return flow from the lift cylinder, controlling the return valve block to provide the return flow from the lift cylinder to the input side of the first hydraulic machine and controlling the second hydraulic machine to provide a flow to the input side of the first hydraulic machine corresponding to the difference between the supply flow requested from the first hydraulic machine and the return flow from the lift cylinder.

12. The method according to claim 1, wherein the second hydraulic cylinder is a tilt cylinder, the method further comprising:
controlling the tilt cylinder to tilt an implement of the working machine; and
if the requested supply flow from the first hydraulic machine is higher than the return flow from the tilt cylinder, controlling the return valve block to provide the return flow from the tilt cylinder to the input side of the first hydraulic machine and controlling the second hydraulic machine to provide a flow to the input side of the first hydraulic machine corresponding to the difference between the supply flow requested from the first hydraulic machine and the return flow from the tilt cylinder.

13. The method according to claim 1, wherein the second hydraulic cylinder is a lift cylinder, the method further comprising:
controlling the lift cylinder to lower an implement of the working machine;
controlling the return valve block to provide the return flow from the lift cylinder to the input side of the first hydraulic machine; and
if the pressure from the lift cylinder is higher than the pressure requested from the first hydraulic machine, controlling the first hydraulic machine to recuperate energy by driving the first electric machine as a generator, wherein a pressure drop over the first hydraulic machine is controlled to be the difference between the pressure from the lift cylinder and the requested pressure.

14. The method according to claim 1, in a system comprising a cylinder main control valve arranged between the respective hydraulic cylinder and the return valve block, further comprising:
controlling the main control valve and the return valve block to allow a return flow through the main control valve and through the return valve block to the second return line;
controlling the second hydraulic machine to provide a pressure in the second return line to achieve a predetermined minimum pressure drop over the main control valve; and
if a return pressure of the hydraulic cylinder increases above a predetermined maximum pressure, controlling the second hydraulic machine to reduce the pressure in the second return line and controlling the main control valve to maintain a requested flow through the valve as before the reduction of pressure in the return line.

15. The method according to claim 1, wherein the second hydraulic cylinder is a lift cylinder and the third hydraulic cylinder is a tilt cylinder, the method further comprising:
controlling the hydraulic system to simultaneously operate the lift cylinder and the tilt cylinder;
determining a required supply pressure for each of the lift cylinder and the tilt cylinder;
controlling the return valve block to connect the return flow of the one of the lift cylinder and the tilt cylinder requiring the lowest supply pressure to the high-pressure side of the second hydraulic machine; and
controlling the second hydraulic machine to provide a pressure on the high-pressure side such that the lift cylinder and the tilt cylinder require the same supply pressure.

16. The method according to claim 1, further comprising:
detecting a malfunction of the first hydraulic machine and/or of the first electric machine;
controlling the return valve block to connect all return flows from the second and third hydraulic cylinders to the low-pressure side of the second hydraulic machine; and
controlling the second hydraulic machine to provide a supply pressure requested from the first hydraulic machine to the input side of the first hydraulic machine.

17. The method according to claim 1, further comprising controlling operation of the second hydraulic machine based on properties of a flow in the third return line.

18. The method according to claim 17, further comprising controlling the second machine to operate at a speed based on a flow in the third return line.

19. A nontransitory computer readable medium comprising a computer program comprising program code for performing the steps of claim 1 when the program is run on a computer.

* * * * *